(12) United States Patent
Su

(10) Patent No.: US 8,341,969 B2
(45) Date of Patent: Jan. 1, 2013

(54) ABSORPTIVE HEAT PUMP SYSTEMS AND HEATING METHOD

(75) Inventor: Qingquan Su, Beijing (CN)

(73) Assignee: Lianliyuan Technology Co., Ltd, Beijing (CN)

(*) Notice: Subject to any disclaimer, the term of this patent is extended or adjusted under 35 U.S.C. 154(b) by 402 days.

(21) Appl. No.: 12/811,373

(22) PCT Filed: Jan. 19, 2009

(86) PCT No.: PCT/CN2009/000077
§ 371 (c)(1),
(2), (4) Date: Jun. 30, 2010

(87) PCT Pub. No.: WO2009/094897
PCT Pub. Date: Aug. 6, 2009

(65) Prior Publication Data
US 2010/0282436 A1    Nov. 11, 2010

(30) Foreign Application Priority Data

Jan. 22, 2008 (CN) .......................... 2008 1 0004335

(51) Int. Cl.
*F25D 15/00* (2006.01)
(52) U.S. Cl. .......................................... 62/119; 62/476
(58) Field of Classification Search .................. 62/119,
62/324.1, 476, 478, 481, 483, 513, 498, 477
See application file for complete search history.

(56) References Cited

U.S. PATENT DOCUMENTS

| | | | | |
|---|---|---|---|---|
| 5,383,342 A * | 1/1995 | El-Boher et al. | ................. | 62/532 |
| 5,526,648 A * | 6/1996 | Wertenbach et al. | ............ | 62/101 |
| 5,617,733 A * | 4/1997 | Tomita et al. | ................. | 62/324.2 |
| 5,732,569 A * | 3/1998 | Sanada et al. | ................... | 62/481 |
| 5,916,258 A * | 6/1999 | Cho | ................................. | 62/476 |
| 5,941,089 A * | 8/1999 | Takaishi et al. | ............... | 62/324.2 |
| 6,128,917 A * | 10/2000 | Riesch et al. | ................... | 62/476 |
| 6,263,696 B1 * | 7/2001 | Machizawa et al. | ............ | 62/476 |
| 6,311,504 B1 * | 11/2001 | Yamazaki et al. | ............... | 62/141 |
| 6,357,254 B1 * | 3/2002 | Xia | ................................. | 62/476 |
| 6,474,099 B2 * | 11/2002 | Tanaka et al. | ................... | 62/480 |
| 6,550,272 B2 * | 4/2003 | Nakajima et al. | ................ | 62/476 |
| 7,071,291 B2 * | 7/2006 | Thompson et al. | ............ | 528/491 |
| 7,107,784 B2 * | 9/2006 | Beck | ............................ | 62/324.2 |

* cited by examiner

*Primary Examiner* — Mohammad Ali
(74) *Attorney, Agent, or Firm* — Helen S. Liu

(57) ABSTRACT

The present invention relates to an absorptive heat pump circulation systems and heating method. According to the present invention, an absorption heat pump circulation system comprises: a generator, equipped with a heat exchanger; an evaporator, equipped with a driving heat source; an absorber, equipped with a heat exchanger; and an absorbent crystallizer. An absorption solution entrance of the crystallizer is connected to an absorption solution exit of the absorber and a crystallized absorption solution exit of the crystallizer is connected to an absorption solution entrance of the generator, and a crystal output of the crystallizer is connected to an absorption solution Entrance of the absorber; The heat exchanger of the generator and the heat exchanger of the absorber are connected to form a thermal cycling loop, which transfers the absorption heat generated by the absorber to the generator. Since the absorbent crystallizer is provided, and the heat generated by the absorber is provided to the generator directly through the thermal cycling loop, then the external driving heat source required by the generator in the traditional absorption heating circulation system is essentially saved, so that the coefficient of performance is significantly improved. The present invention extensively applies to the utilization of excess heat at a low temperature as well as energy-saving and emission-reducing in the fields such as chemical industry, food industry, sewage treatment, sea water desalination and so on.

19 Claims, 6 Drawing Sheets

ABSORPTIVE HEAT PUMP SYSTEMS AND HEATING METHOD

CROSS REFERENCE TO RELATED APPLICATION

This application is a National Phase Application of International Application No. PCT/CN2009/000077, filed on Jan. 19, 2009, which claims priority to and the benefit of Chinese Patent Application Serial No. 200810004335.5, filed on Jan. 22, 2008. This application claims priority to and the benefit to each of the above two applications, each the disclosure of which is incorporated by reference in its entirety.

FIELD OF THE INVENTION

The present invention in general relates to absorptive heat pump circulation technology in thermal engineering field, in particular, relates to absorptive heat pump system and heating method that carry absorptive heating under the condition of only one set of external driving heat source and output heat of high grade outward, which extensively apply to the utilization of excess heat at a low temperature and also energy-saving and emission-reducing in the process of distillation fractionation, evaporation concentration, materials desiccation, adsorbent regeneration and so on, in the fields of such as chemical industry, food industry, sewage treatment, sea water desalination and so on.

BACKGROUND OF THE INVENTION

With reference to FIG. 1, current absorptive heat pump circulation system is characterized in utilizing absorption solution can precipitate steam with components of low boiling points under a certain condition, and can intensively absorb steam with components of low boiling points under another condition. The absorptive heat circulation in prior art mostly adopts the absorption solution with two components, often the component of low boiling point is referred as working medium, and the component of high boiling point is referred as absorbent, and the two components form a working medium pair, which is commonly aqua-lithium bromide working medium pair. Current absorptive heat pump circulation system mainly comprises: a generator 11 equipped internally with a heat exchanger 110, a condenser 12 equipped internally with a heat exchanger 120, an evaporator 13 equipped internally with a heat exchanger 130 and an absorber 14 equipped internally with a heat exchanger 140, besides, it further comprises an absorption solution self heat exchanger 150, an absorption solution pump, a throttler (not shown in the figure) and so on as auxiliary devices. The generator 11 and condenser 12 are connected through steam pipeline 19, and evaporator 13 and absorber 14 are connected through steam pipeline 18. The absorption solution circulates between the generator 11 and the absorber 14 through absorption solution pipeline 16 and 15.

The operation process of the current absorptive heat pump circulation comprises: (1) utilizing driving heat source (for example, water steam, hot water, combustion gas and so on to heat the lithium bromide solution with a specific concentration transferred from the absorber 14 in the generator 11, and evaporate the water out of the lithium bromide solution, to form the lithium bromide with thicker concentration to circulate into the absorber 14; (2) the water steam entering into the condenser 12 through the steam pipeline 19, and being condensed into to condensation water by the condensing working medium in the heat exchanger 120; (3) the condensation water entering into the evaporator 13 through the condensation water pipeline 17, and feeding the same one or another driving heat source with the heat exchanger 130, so that the condensation water from the condenser can be converted into water steam; (4) the water steam entering into the generator 14 through the steam pipeline 18, and being absorbed by the absorption solution from the generator 11 and generates absorption heat, meanwhile the concentration of the absorption solution being reduced, and the absorption solution with thicker concentration circulates into the generator 11, the absorption heat being used to heat the working medium (generally water) in the heat exchanger 140, increasing the temperature of the working medium and the heat as heating energy with higher grade than the driving heat source being outputted outward (when the working medium is water, it can be outputted in the form of water steam), to achieve the target that the present absorptive heat pump circulation system outputs heat energy with high grade outward. In the circulation process, the absorption solution from the absorber 14 exchanges heat with the absorption solution from the generator 11 in the absorption solution self heat exchanger 150.

Apart from the necessity of setting an external driving heat source for evaporating the condensation water in the heat exchanger 130 of the evaporator, the above mentioned current absorption heat pump circulation system, also has to adopt the same one or another external driving heat source to heat the absorption solution, so as to obtain the absorption solution with high concentration. That is to say, the current heat pump circulation system must utilize two external driving heat sources in the generator and the evaporator concurrently, which not only limits the improvement of the heat pump circulation heating coefficient, but also limits the application of the heat pump circulation system in the area in lack of high grade heat source and water source.

SUMMARY

It is the fundamental object of the present invention to overcome the existing problem of the absorptive heat pump circulation system and the heating method, and provide an absorptive heat pump circulation system of self-energized driving heat source and a heating method, and the technical problem to be solved is to operate absorptive heating under the condition of only one external driving heat source, to output heat energy with high grade outward, in order to significantly improve heating coefficient, i.e. energy efficiency, so that it has more practicability and more industry value.

The objective of the present invention and the solution of the technical problems are achieved by the following technical solution. According to the present invention, an absorptive heat pump circulation system comprises: a generator, equipped with a heat exchanger for concentrating absorption solution and outputting steam outward; an evaporator, equipped with a heat exchanger, with which feed driving heat source; an absorber, equipped with a heat exchanger; an absorbent crystallizer, receiving and cooling the absorption solution from the absorber and/or the generator, and forming the absorbent crystals and absorption solution after crystallization, wherein the absorption solution after crystallization is transferred to the generator, and the absorbent crystals is transferred to the absorber; the heat exchanger of the generator and the heat exchanger of the absorber are connected to form a thermal cycling loop, which transfers absorption heat generated by the absorber to the generator.

The objectives of the present invention are further achieved by the following technical solution.

Preferably, the absorptive heat pump circulation system described above further comprises: an absorption solution self heat exchanger, for exchanging heat between the absorption solution from the generator and/or the absorber, and the absorption solution after crystallization and/or the absorbent crystals or the absorption solution containing absorbent crystals.

Preferably, the absorptive heat pump circulation system described above further comprises: an absorption solution self heat exchanger, for exchanging heat between the absorption solution from the absorber and the absorption solution after crystallization from the absorbent crystallizer.

Preferably, the absorptive heat pump circulation system described above further comprises: an absorption solution self heat exchanger, for exchanging heat between the absorption solution from the absorber and the absorbent crystals from the absorbent crystallizer or the absorption solution containing absorbent crystals from the absorbent crystallizer.

Preferably, the absorptive heat pump system described above further comprises: an absorption solution self heat exchanger, for exchanging heat between the absorption solution from the absorber as well as the absorption solution after crystallization from the absorbent crystallizer, and the absorbent crystals or the absorption solution containing absorbent crystals.

Preferably, in the absorptive heat pump system described above, the absorption solution from the absorber and the absorption solution from the absorbent crystallizer are mixed and the mixture enters into the absorption solution self heat exchanger, and then exchanges heat with the absorption solution after crystallization from the absorbent crystallizer and the absorbent crystals or the absorption solution containing absorbent crystals.

Preferably, in the absorptive heat pump system described above, the heat cycling loop is provided with an external heat source heating device, for compensating the insufficient part of the heating capacity of the generator caused by the heat-dissipating loss.

Preferably, the absorptive heat pump circulating system further comprises water source, for providing water for the evaporator.

Preferably, the absorptive heat pump system further comprises: a compression refrigeration subsystem constituted of absorbent crystallizer-evaporator, compressor, absorption solution heat exchanger-condenser, throttle valve and compression refrigeration working medium pipeline, for providing cooling capacity for the absorbent crystallizer.

The objective of the present invention and the solution of the problem are achieved by the following technical solution. According to the present invention, an absorptive heating method comprises the following steps:

(1) concentrating the absorption solution in a generator and meanwhile generating steam, and then outputting the steam outward, transferring the concentrated absorption solution to an absorber;

(2) utilizing driving heat source to heat absorption solution in the evaporator, and the generated steam being led into the absorber;

(3) the absorption solution absorbing the steam from the evaporator in the absorber and generating absorption heat, and meanwhile the concentration of the absorption solution being decreased and the absorption solution being transferred to the absorbent crystallizer;

(4) performing cooling, crystallizing and liquid-solid separating for the absorption solution in the absorbent crystallizer, forming absorbent crystals and absorption solution after crystallization, the absorption solution after crystallization being transferred to the generator, and the absorbent crystal and the absorption solution containing absorbent crystals being transferred to the absorber;

(5) performing heat circulation between the absorber and the generator, the absorption heat generated when the absorption solution absorbs the steam in the absorber is transferred to the generator.

Preferably, the method for absorptive heating described above further comprises, before the absorption solution after crystallization being transferred to the generator and before the absorption solution outputted by the absorber being cooled, the absorption solution output by the absorber exchanges heat with the absorption solution after crystallization.

Preferably, the method for absorptive heating described above further comprises, before the absorbent crystal being transferred to the absorber and before the absorption solution outputted by the absorber being cooled, the absorbent crystals or the absorption solution containing absorbent crystals exchanges heat with the absorption solution outputted by the absorber.

Preferably, the method for absorptive heating described above further comprises, before the absorption solution after crystallization being transferred to the generator, the absorbent crystal being outputted to the absorber and the absorption solution outputted by the absorber being cooled, the absorption solution outputted by the absorber exchanges heat with the absorbent crystals as well as the absorption solution after crystallization.

Preferably, the method for absorptive heating described above further comprises, before the absorption solution after crystallization being transferred to the generator, the absorbent crystal being transferred to the absorber and before the absorption solution outputted by the absorber being cooled, the absorption solution outputted by the generator and the absorption solution outputted by the absorber are mixed to form a mixed absorption solution, the mixed absorption solution exchanges heat with the absorbent crystals as well as the absorption solution after crystallization.

Preferably, the method for absorptive heating described above further comprises, in the heat circulation process of step (5), the insufficient heating part of the heating capacity of the generator is compensated through external heat source.

Preferably, for the method for absorptive heating described above, the temperature of the driving heat source after utilization is no lower than 2° C.

Preferably, for the method for absorptive heating described above, the cooling capacity required for cooling and crystallizing the absorption solution in step (4) is provided by compression refrigeration circulation.

Preferably, for the method for absorptive heating described above, the compression refrigeration circulation comprises:

compressing the refrigeration working medium, to increase the pressure and temperature of the refrigeration working medium;

the refrigeration working medium with increased temperature exchanges heat with the absorption solution after crystallization from the absorbent crystallizer and/or absorbent crystals or absorption solution containing absorbent crystals;

after being dilated, the refrigeration working medium after heat exchanging absorbing heat from the absorbent crystallizer.

Preferably, for the method for absorptive heating described above, the temperature of cooling and crystallizing the absorption solution in step (4) is −15~60° C.

The driving heat source in the technical solution described above can utilize the excess heat at a low temperature of great volume and difficult to utilize in the high-energy consumption industry, such as steel industry, building material industry and chemistry industry.

Compared with current technology, the present invention possesses obvious advantage and beneficial effects. According to the above technical solution, because of an absorbent crystallizer and the heating energy generated by the absorber being provided to the generator directly through the heat cycling loop, the absorptive heat pump circulation systems and heating method of the present invention therefore can basically omit the external driving heat source required by the generator in the current absorptive heating circulation system to realize absorptive heating, so that the coefficient of performance (COP) is improved and the temperature of the driving heat source required, i.e. the temperature of the available excess heat at a low temperature, is significantly decreased, so as to be more practical.

Besides, since the absorptive heat pump system of the present invention needs no setting of a condenser, therefore, different from the current absorption heat pump circulation, the present invention does not adopt condensation water to cool down the condenser, so that the operational load of the cooling tower can be largely reduced, meanwhile the water resource is saved.

The preferred embodiments and detailed description with the accompanying drawings are set forth in this invention as below, to fully understand the technical solution of this invention and thereafter implement the solution according to the description.

| | |
|---|---|
| 11: | generator |
| 12: | condenser |
| 13: | evaporator |
| 14: | absorber |
| 17: | condensation water pipeline |
| 18 and 19: | steam passage |
| 15, 16, 20 and 30: | absorption solution pipeline |
| 40: | pipeline for absorption solution after crystallization |
| 50: | pipeline for solution containing crystals |
| 60: | working medium pipeline for heat circulation |
| 110, 120, 130 and 140: | heat exchanger |
| 141: | absorbent crystallizer |
| 142: | mixer |
| 150: | absorption self heat exchanger |
| 160: | heating device for external heat source |
| 200: | absorbent crystallizer-evaporator |

-continued

| | |
|---|---|
| 210: | compressor |
| 220: | absorbent heat exchanger-condenser |
| 230: | throttle valve |
| 240: | compression refrigeration working medium pipeline |

DETAILED DESCRIPTION

Various aspects are now described with reference to the drawings. In the following description, for purposes of explanation, numerous specific details are set forth in order to provide a thorough understanding of the absorption heat pump system and its specific embodiment, structure, feature and functions.

Figure 1:
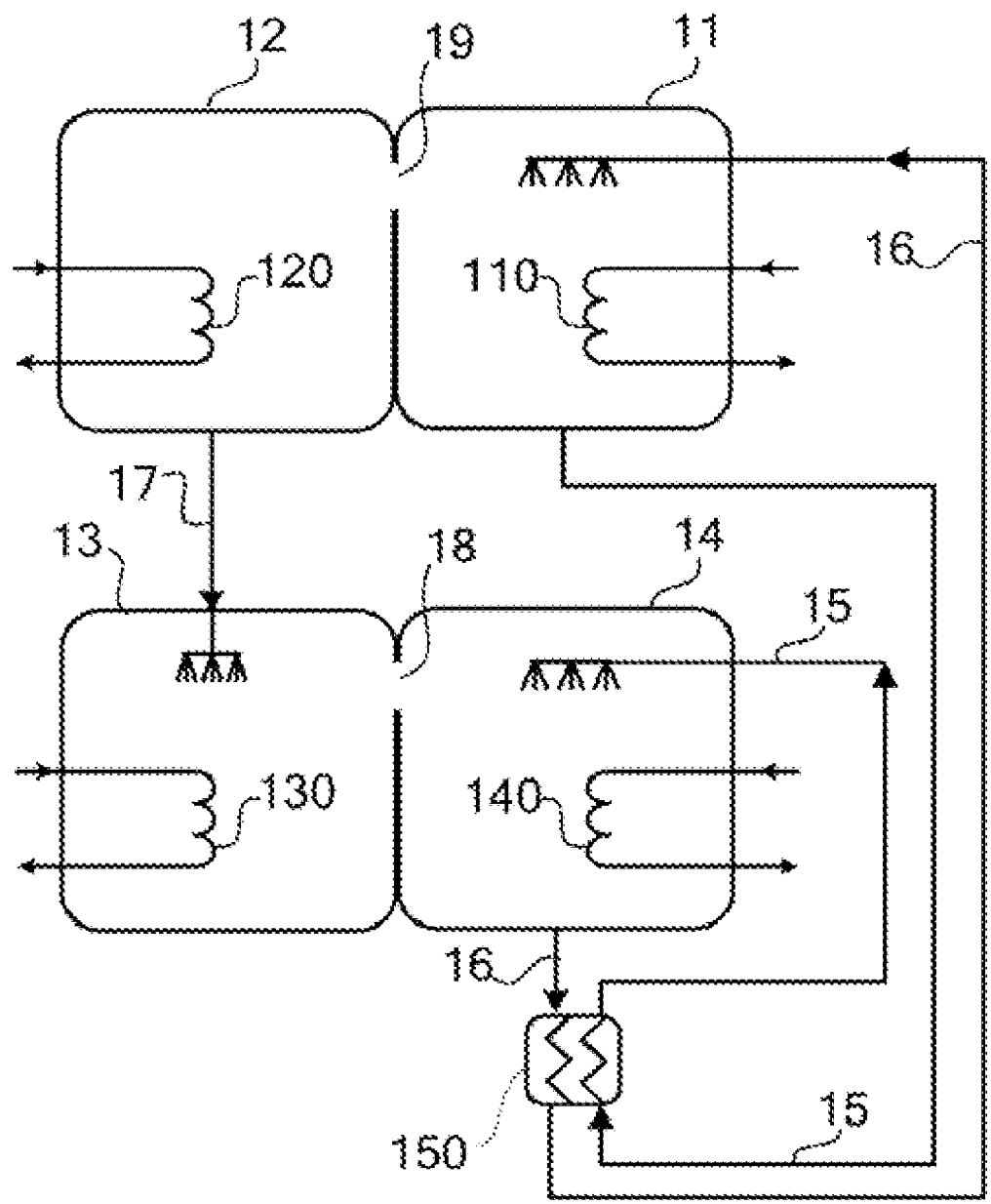
FIG. 1 illustrates a flow chart of an absorptive heat pump circulation system in prior art.
Figure 2:
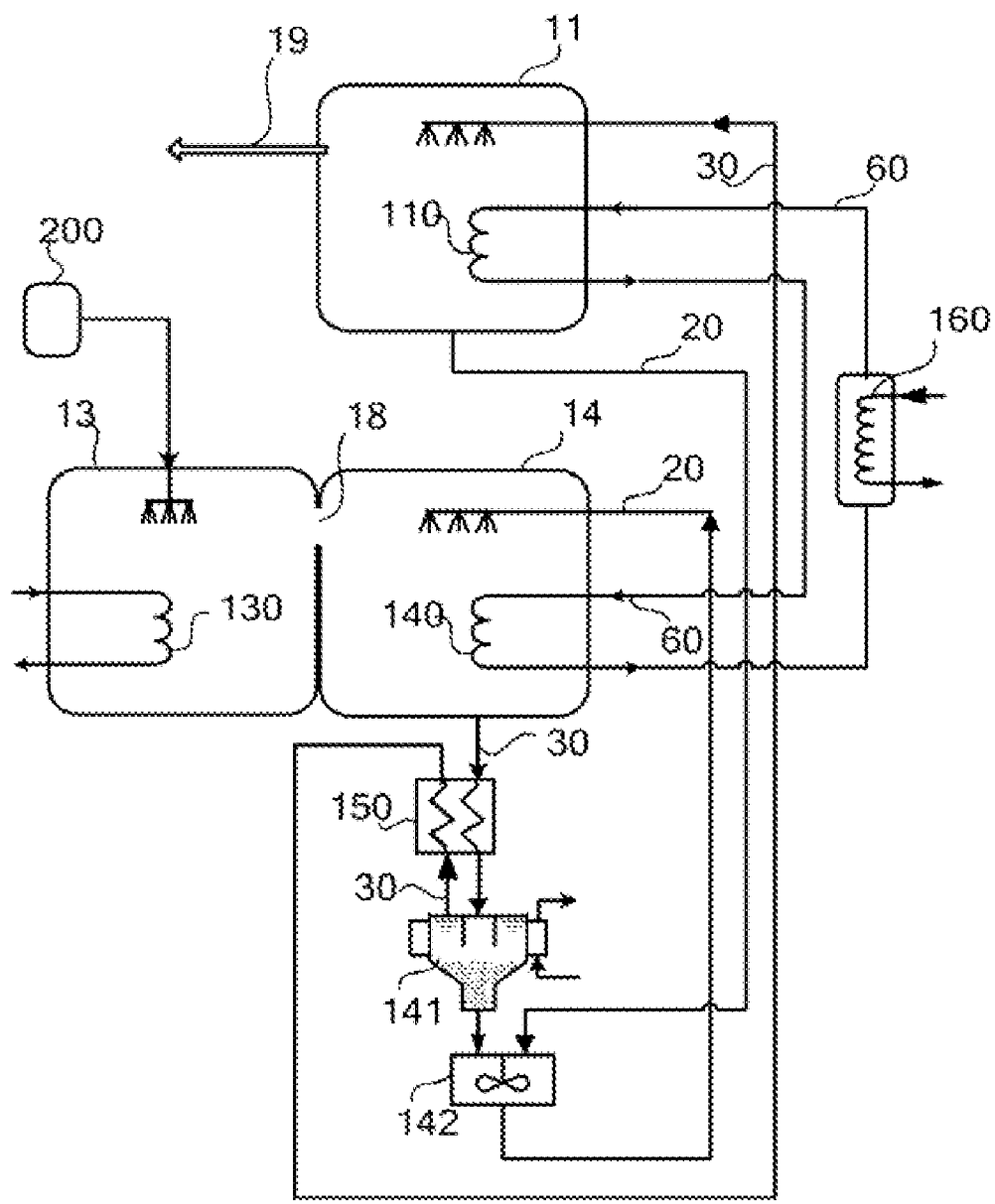
FIG. 2 illustrates a flow chart of an absorptive heat pump circulation system according to the first embodiment of the present invention.

With reference to FIG. 2, a flow chart of the absorption heat pump circulation system according to the first embodiment of the present invention is illustrated, the absorptive heat pump circulation system, mainly comprises: a generator 11, an evaporator 13, an absorber 14 and water source 200, and absorption solution utilizing aqua-lithium bromide working medium pair. The generator 11 is configured to concentrate absorption solution, which is provided with a heat exchanger 110 therein, feed the heat circulation working medium from the heat exchanger 140 in the absorber 14 with the heat exchanger 110, to heat the lithium bromide as the absorption solution to evaporate the water therein, so that the concentration of the absorption solution is increased, and the high temperature steam generated thereby is outputted through the steam passage 19, as so as to be further utilized by the users. The absorption solution in the outlet of the absorber 11 enters into the generator 14 through the absorption solution pipeline 20, and the absorption solution in the outlet of the generator 14 enters into the generator 11 through the absorption solution pipeline 30. The absorption solution is circulated between the generator 11 and the absorber 14 through the absorption solution pipelines 20 and 30. The heat pump evaporator 13 is provided with a heat exchanger 130, feed the driving heat source with the heat exchanger 130 to convert the water from the water source into steam, the generated steam is led into the absorber 14 via the steam passage 18. The absorber 14 is provided with a heat exchanger 140, and in the absorber 14, the absorption solution of high concentration from the generator 11 absorbs the steam from the evaporator 13 and generates the absorption heat, so that the temperature of the heat circulation working medium in the heat exchanger 140 is increased. The heat exchanger 140 and the heat exchanger 110 in the generator 11 are connected by heat circulation working medium pipeline 60 to form a heat cycling loop, so as to provide the absorption heat generated by the absorber 14 to the generator 11 as the driving heat of the generator. In the present embodiment, the heat cycling loop is a heat pipe cycling loop, at the moment, the installation position of the generator 11 is higher than that of the absorber 14. Regarding the heat pipe cycling, the working medium in the heat pipe can form convection by the process of condensing-evaporating without external driving force, so as to circulate between the absorber and the generator and transfer heat. The heat cycling loop is provided with a heating device 160 with external heat source, for compensating the insufficient part of the heat of the generator caused by radiation loss.

According to the first embodiment of the present invention, the absorptive heat pump system is further provided with an absorbent solution heat exchanger 150, absorbent crystallizer 141 and mixer 142 between the absorber 14 and the generator 11. The absorbent crystallizer 141 has an input for absorption solution, an output for absorption solution after crystallization and an output for absorbent crystals. The input for absorption solution of the absorbent crystallizer connects to the outlet for absorption solution of the absorber 14 through the absorption self heat exchanger 150, the crystallization outlet for the absorption solution in the absorbent crystallizer connects to the inlet for the absorption solution of the generator 11, and the crystallization outlet for the absorption solution connects to the inlet for the absorption solution of the generator through the mixer 142 in the case that the mixer 142 exists. The outlet for the absorption solution of the generator 11 enters into the absorber 14 through the absorption solution pipeline 20 via the mixer 142, and outlet for the absorption solution of the absorber 14 enters into the absorbent crystallizer 141 through the absorption solution pipeline 30 via absorption solution self heat exchanger 150. In the absorbent crystallizer 141, the low temperature cooling capacity is utilized to cool and crystallize the absorption solution, because crystals generate if aqueous solution of lithium bromide reaches or approaches crystallization point, the lower the crystallization temperature is, the lower the equilibrium concentration of liquid-phase lithium bromide is, therefore, through cooling and crystallizing, however high the concentration of the lithium bromide the absorption solution before cooling and crystallizing, and after crystallization the concentration of the lithium bromide can reach or approach to the equilibrium concentration of liquid-phase lithium bromide at the cooling temperature. After crystallization and solid-liquid separation, the absorption solution after the crystallization in absorbent crystallizer 141, i.e., dilute solution of lithium bromide, is transferred to the generator 11 through the absorption solution pipeline 30 via the absorption solution heat exchanger 150. The cool source employed by the absorbent crystallizer 141 described above can be cooling water of 0-32° C. The water source 200 can be domestic water or industrial water, or the condensation water formed after the high temperature steam output by the generator 11 is utilized; if other working medium is employed as the working medium of the absorption solution, then the water source 200 can also provide corresponding liquid-phase working medium. The absorptive heating device of the present embodiment only needs driving heat source provided in the evaporator 13, i.e., high temperature steam can be obtained in the steam pipeline 19 of the generator 11.

The absorption solution in the absorbent crystallizer 141 can form absorbent crystals and absorption solution after crystallization. The absorbent crystal mentioned in the present embodiment and the following embodiments are not only limited to adopt absorbent crystals particles, but also absorption solution containing absorbent crystals particles. There are other relationships among absorber 14, generator 11, absorption solution self heat exchanger 150 and absorbent crystallizer 141 as described hereinafter.

Figure 3:
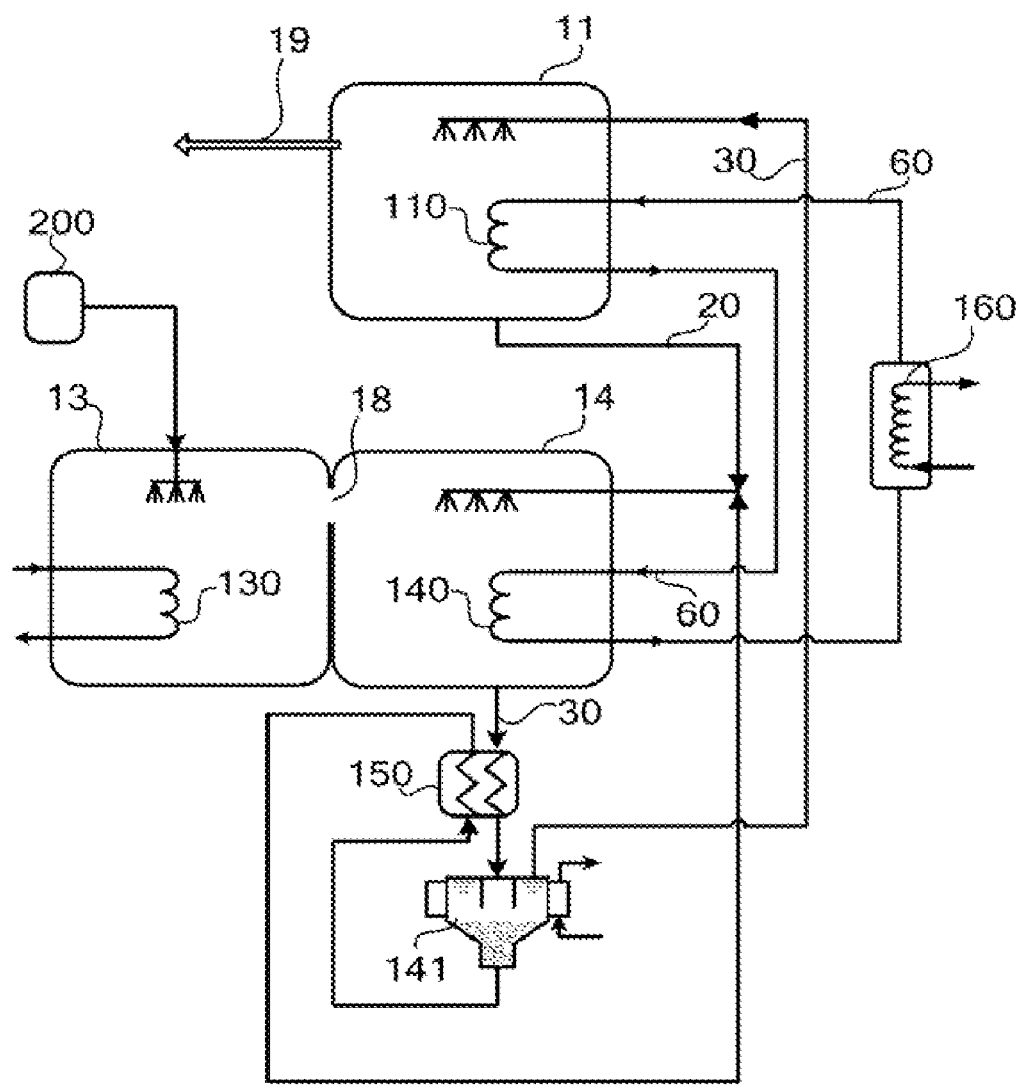
FIG. 3 illustrates a flow chart of an absorptive heat pump circulation system according to the second embodiment of the present invention.

With reference to FIG. 3, a flow chart of the second embodiment according to the present invention is illustrated. The absorption solution self heat exchanger 150 is configured to exchange heat between the absorption solution from the absorber 14 and the absorbent crystals (the absorption solution containing the absorbent crystals) outputted from the absorbent crystallizer 141. The outlet for the absorption solution pipeline 20 of the generator 11 connects with the inlet for the absorption solution pipeline of the absorber, so that the absorption solution outputted from the generator 11 is mixed with the absorbent crystals after heat exchanging and then inputted into the absorber together. The absorption solution after crystallization from the absorbent crystallizer 141 is outputted to the generator 11 via the inlet for the absorption solution pipeline 30. After heat exchanging, the absorption solution from the absorber 14 is delivered into the absorbent crystallizer 141 to carry on cooling, crystallizing and liquid-solid separating; after heat exchanging, the absorbent crystal from the absorbent crystallizer 141 is delivered into the absorber 14 via the inlet for the absorption solution pipeline. Because the temperature of the absorption solution from the absorber 14 is much higher than that of the absorbent crystal outputted from the absorbent crystallizer 141, after heat exchanging, the temperature of the absorption solution entering into the absorbent crystallizer 141 significantly decreases, so as to decrease the cooling capacity for cooling the absorption solution. Meanwhile, the temperature of the absorbent crystals from the absorbent crystallizer after heat exchanging is greatly increased, and the absorbent crystals from the absorbent crystallizer is transferred to the absorber to absorb the working medium steam of the same quantity, and release absorption heat in higher operation temperature, so as to increase the temperature that the absorber outputs outward, improve the heat grade and enhance power utilization efficiency.

Figure 4:
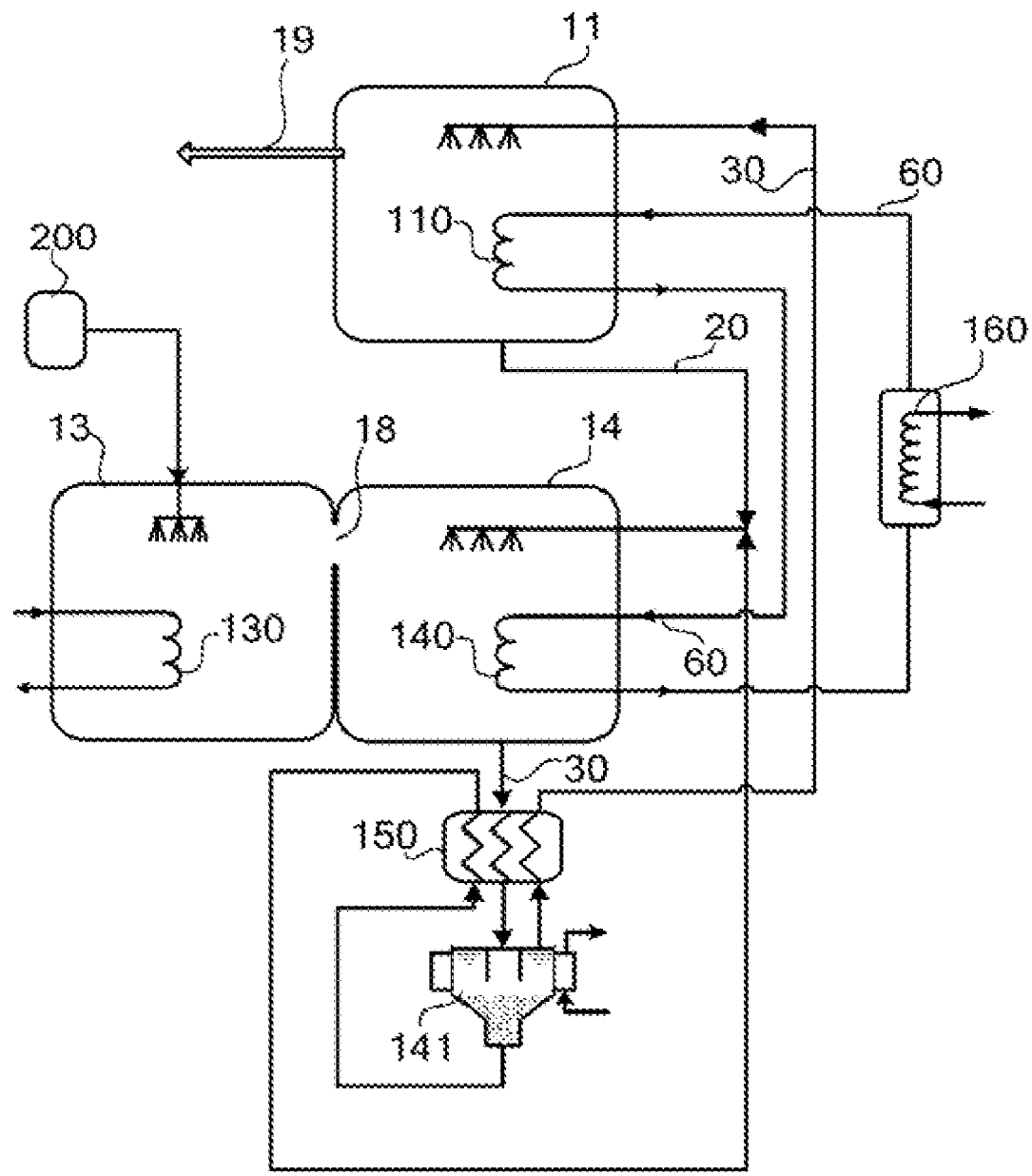
FIG. 4 illustrates a flow chart of an absorptive heat pump circulation system according to the third embodiment of the present invention.

With reference to FIG. 4, a flow chart of the third embodiment according to the present invention is illustrated. After crystallization, the solution outputted from the absorbent crystallizer 141 also pass through absorption solution self heat exchanger 150, and the solution from the absorber 14 exchanges heat with the absorbent crystals outputted from the absorbent crystallizer 141 (or the absorption solution containing the absorbent crystals) as well as the absorption solution after crystallization concurrently. After heat exchanging, the absorption solution after crystallization is delivered to the generator 11 via absorption solution input pipeline 30. The absorption solution output pipeline 20 of the generator 11 is connected with the absorption solution input pipeline of the absorber, so as to mix the absorption solution outputted from the generator 11 and the absorbent crystals after heat exchanging and deliver the mixture into the absorber together. The absorption solution after crystallization from the absorbent crystallizer 141 is delivered to the generator 11 via the absorption solution input pipeline 30. After heat exchanging, the absorption solution from the absorber 14 is delivered into the absorbent crystallizer 141 to carry on cooling, crystallizing and liquid-solid separating; after heat exchanging, the absorbent crystals from the absorbent crystallizer 141 is delivered into the absorber 14 via absorption solution input pipeline. Because the temperature of the absorption solution from the absorber 14 is far higher than the temperature of the absorbent crystals outputted from the absorbent crystallizer 141 as well as the absorption solution after crystallization, after heat exchanging, the temperature of the absorption solution entering into the absorbent crystallizer 141 is significantly decreased, so as to decrease the cooling capacity for cooling the absorption solution. Meanwhile, after heat exchanging, the temperature of the absorbent crystals from the absorbent crystallizer is greatly increased, and the absorbent crystals from the absorbent crystallizer is transferred to the absorber to absorb the working medium steam of the same quantity, and release absorption heat in higher operation temperature, so as to increase the temperature that the absorber outputs outward and improve the heat grade. After heat exchanging, the temperature of the solution after the crystallization from the absorbent crystallizer is significantly increased, and the solution after the crystallization from the absorbent crystallizer is transferred to the generator, to evaporate the same working medium steam, and in the present embodiment the heat consumed by the generator can be reduced, so as to enhance power utilization efficiency.

Figure 5:
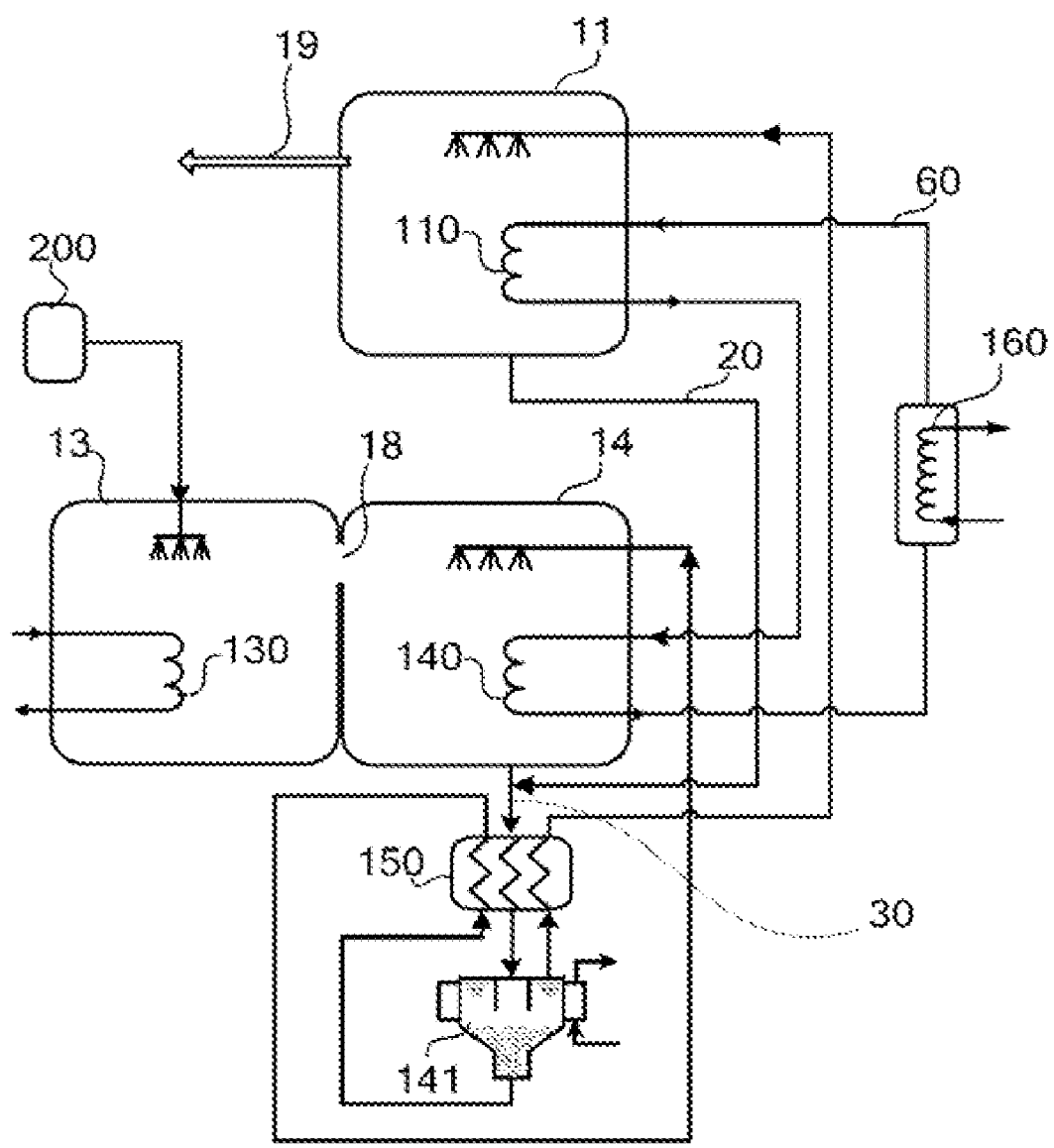
FIG. 5 illustrates a flow chart of an absorptive heat pump circulation system according to the fourth embodiment of the present invention.

With reference to FIG. 5, a flow chart of the fourth embodiment of the present invention is illustrated. The absorption solution output pipeline 20 of the generator 11 is connected with the absorption solution output pipeline 30 of the absorber 14, and the joint is located before the absorption solution self heat exchanger 150. The absorption solution from the generator 11 and the absorption solution from the absorber 14 are mixed and then the mixture enters into the absorption solution self heat exchanger 150, to concurrently exchange heat with the absorbent crystals and the absorption solution after crystallization outputted from the absorption crystallizer 141. After heat exchanging, the absorption solution after crystallization is transferred to the generator 11 via the absorption solution input pipeline. After heat exchanging, the absorbent crystals is transferred to absorber 14 via the absorption solution input pipeline. Compared with the previous method, the method that the absorption solution from the generator 11 and the absorption solution from the absorber 14 are mixed and then carry on cooling and crystallizing increases the quantity of the absorption solution being cooled and crystallized, so as to obtain more absorption solution crystallized, so that the utilization efficiency of the absorbent crystallizer is enhanced.

Figure 6:
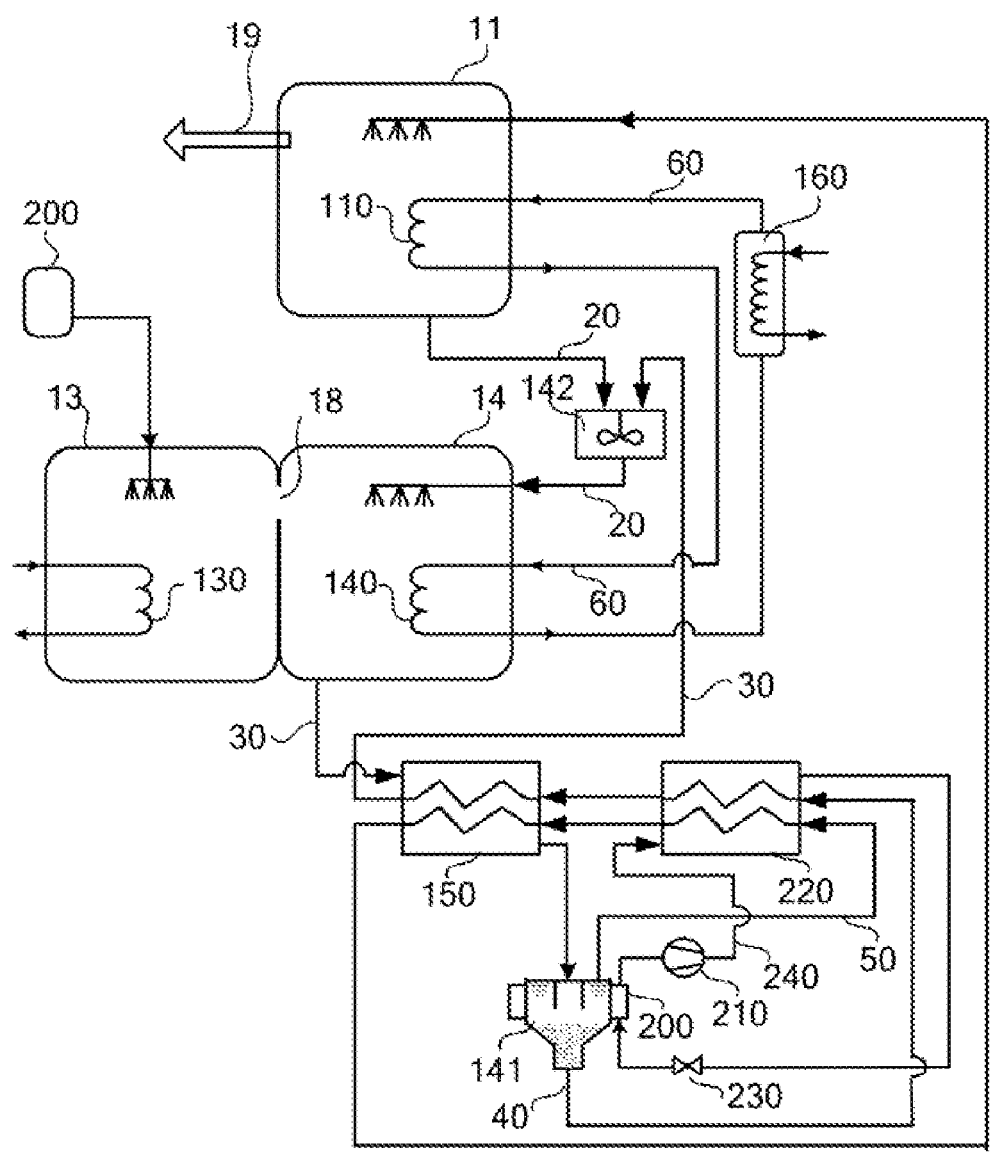
FIG. 6 illustrates a flow chart of an absorptive heat pump circulation system according to the fifth embodiment of the present invention.

With reference to FIG. 6, a flow chart of the fifth embodiment according to the present embodiment. The absorptive heat pump circulation is essentially the same as the previous embodiment, and the difference lies in that, it further comprises a compression refrigeration circulation subsystem, for providing cooling capacity at a low temperature for the absorbent crystallizer 141. The compression refrigeration circulation subsystem comprises: absorbent crystallizer-evaporator 200, compressor 210, absorption solution heat exchanger-condenser 220, throttle valve 230 and compression refrigeration working medium pipeline 240. After compression refrigeration working medium is condensed in the heat exchanger-condenser 220, it is evaporated in the absorbent crystallizer-evaporator 200 through throttle valve 230, so as to provide cooling capacity at a low temperature for the absorbent crystallizer 141. The steam of the compression refrigeration working medium in the outlet of the absorbent crystallizer-evaporator 200 is compressed by the compressor 210 and then enters into the absorption solution heat exchanger-condenser 220, so as to accomplish the compression refrigeration circulation. The absorbent crystallizer-evaporator 200 can be a component of the absorbent crystallizer 141.

Since part of the crystals in the absorbent (lithium bromide) extracts, the concentration of the absorbent solution crystallized after liquid-solid separation in the absorbent crystallizer 141 is decreased. After the crystallization, the absorbent solution, i.e. lithium bromide dilute solution, is inducted to the generator 11 via the absorption solution crystallization pipeline 50 and thereafter the absorption solution heat exchanger-condenser 220 and the absorption solution self heat exchanger 150. On the other hand, the absorbent crystals and the absorption solution containing absorbent crystals after liquid-solid separation in the absorbent crystallizer 141 is inducted to the mixer 142 via pipeline 40 containing crystallization solution and thereafter the absorption solution self heat exchanger-condenser 220 and the absorption solution self heat exchanger 150. The function of the absorption solution self heat exchanger 150 lies on heat exchanging for the absorption solution at a high temperature from the absorber 14 and the absorption solution after crystallization and the absorbent crystals or the absorption solution containing the absorbent crystals at a low temperature from the absorbent crystallizer, so as to increase the solution temperature provided to the generator 11 and the mixer 142, and meanwhile decrease the temperature of the absorption solution provided to the absorbent crystallizer. The function of the absorption solution heat exchanger-condenser 220 lies on heat exchanging for the compression refrigeration working medium steam at a high temperature from the compressor 210 of the compression refrigeration circulation subsystem and the absorption solution after crystallization and the absorbent crystals or the absorption solution containing the absorbent crystals at a low temperature from the absorbent crystallizer 141, so as to condense the refrigeration working medium steam, and meanwhile completely or partially melt the absorbent crystals and increase the temperature of the absorption solution. Through the condense in the generator 11, the absorption solution in the outlet for the generator 11 with increased concentration of absorbent is inducted into the mixer 142 to mix with the absorbent crystals (or the absorption solution containing absorbent crystals) through the absorption solution pipeline 20, and then the mixture is inducted into the absorber 14 together. The present invention can set and optimize the absorbent operation concentration of the absorption solution in the absorber 14 and generator 11 separately. That is to say, the present invention can realize an extremely advantageous technological condition for absorption refrigeration circulation, i.e., while the absorber is operating under the condition of high absorbent concentration, the generator is operating under the condition of the absorbent concentration lower than that of the absorber, which is difficult for the traditional absorptive heat pump circulation. Since the absorbent crystallizer 141 is provided, and the heat generated by the absorber 14 is provided for the generator 11 directly through thermal cycling loop, so as to basically save the external driving heat source for providing heat for the generator 11 in the current absorptive heat pump circulation, and realize the absorptive heating process with self-contained driving heat source.

The sixth embodiment of the present invention provides absorptive heating method, which employs the absorptive heat pump circulation system of the embodiments described above, the refrigeration method comprises the following steps:

(1) Condensing the absorption solution in the generator and meanwhile generating steam, and then delivering the steam to the users, and the concentrated absorption solution being outputted;

(2) Employing driving heat source to heat the absorption solution in the evaporator, and introducing the generated steam into an absorber;

(3) In the absorber, the absorption solution from the generator absorbing the steam from the evaporator and generating absorption heat, and meanwhile the concentration of the absorption solution being decreased and delivering to an absorbent crystallizer;

(4) In the absorbent crystallizer, carrying on cooling, crystallizing and liquid-solid separating for the absorption solution, forming absorbent crystals and absorption solution after crystallization, the absorption solution after crystallization being transferred to the generator, and the absorbent crystals and the absorption solution containing absorbent crystals being transferred to the absorber;

(5) Carrying on heat exchanging between the absorber and the generator, i.e. the absorption heat generated when the absorption solution absorbs the steam in the absorber is transferred to the generator. In particular, the heat exchanger in the absorber and the heat exchanger in the generator are connected to form a thermal cycling loop, and the working medium (commonly water) in the thermal cycling loop absorbs the absorption heat in the absorber and transfers it into the generator, releases the heat in the generator and then returns to the absorber.

The water in the evaporator can be from independent water source or condensation water formed after the steam outputted by the generator is utilized.

Preferably, before the absorption solution crystallized being outputted to the generator and the absorption solution outputted by the absorber being cooled, the absorption solution after crystallization and the absorption solution outputted by the absorber exchange heat.

Preferably, before the absorbent crystal being output to the absorber and the absorption solution output by the absorber being cooled, the absorbent crystal and the absorption solution output by the absorber are heat exchanging.

Preferably, before the absorption solution crystallized being outputted to the generator, the absorbent crystals being outputted to the absorber and the absorption solution outputted by the absorber being cooled, the absorption solution outputted by the absorber and the absorbent crystals as well as the absorption solution after crystallization are heat exchanging.

Preferably, before the absorption solution crystallized being outputted to the generator, the absorbent crystals being outputted to the absorber and the absorption solution outputted by the absorber being cooled, the absorption solution outputted by the generator and the absorption solution outputted by the absorber are mixed to form a mixed absorption solution, the mixed absorption solution and the absorbent crystals as well as the absorption solution after crystallization exchange heat.

Through cooling and crystallizing for the absorbent, the absorption from the generator and/or the absorber and the absorption solution after crystallization and/or the absorbent crystals outputted from the absorbent crystallize exchanges heat, one of whose effects lies in that, only minor external cooling capacity and heating capacity are utilized to maintain the absorbent operation concentration of the absorption solution in the generator relatively low, and meanwhile significantly increase the absorbent operation concentration of the absorption solution in the absorber, so that the absorption heat at a higher temperature is obtained in the absorber, and the absorption heat can be utilized as driving heat source of the generator.

Since an absorbent crystallization process is involved in the method described above, in the case of maintaining the absorbent operation concentration of the absorption solution in the generator relatively low, the absorbent operation concentration of the absorption solution in the absorber is significantly increases meanwhile, so that the absorption heat at a higher temperature is obtained in the absorber, and the absorption heat can be utilized as driving heat source of the generator and raise the operation temperature of the generator, i.e., produce working medium steam with a higher temperature.

Preferably, heat compensation is provided for the thermal cycling process described above, i.e. an external heat source heating device is set to compensate thermal deficiency of the generator heating capacity caused by the dissipation loss, so as to ensure the heating process to keep operating.

The steps in the present embodiment are carrying concurrently without specific sequence in the operation, and all the steps constitute the absorptive heating method together.

The seventh embodiment according to the present invention provides another absorptive heating method, and the absorptive heating method is essentially the same as the previous embodiment, and the difference lies in that, the low temperature cooling capacity required by the cooling and crystallizing of the absorption solution in the absorbent crystallizer comes from compression refrigeration circulation process. The steam of the compression refrigeration working medium in the outlet for the absorbent crystallizer-evaporator 200 enters into the absorption solution heat exchanger-condenser 220 to be condensed after being compressed by the compressor 210, and the compression refrigeration working medium is evaporated in the absorbent crystallizer-evaporator 200 after passing through the throttle valve 230, so as to accomplish the compression refrigeration circulation. Since according to the present invention, when the compression refrigeration working medium is condensed in the absorption solution heat exchanger-condenser 220, the cooling capacity comes from the cooling capacity of the solution in the outlet for the lithium bromide crystallizer 141, therefore the evaporation temperature and the condensation temperature of the present circulation are relatively close, so as to reach higher refrigeration performance coefficient. In another words, the power consumption of the compression refrigeration circulation according to the present invention is relatively low.

The technical solution of the embodiment described above has no specific constrain over the absorption solution types utilized, and all takes working medium of aqua-lithium bromide as the absorption solution for sample explanation, in the other embodiments, the working medium can be one of or a mixture of several ones of water, methanol and ethanol; absorbent can be one of or a mixture of $LiBr$, $LiCl$, $LiNO_3$, $NaBr$, $KBr$, $CaCl_2$, $MgBr_2$ and $ZnCl_2$.

The applicability of the embodiments described above is demonstrated by the following embodiments with specific parameters.

Embodiment 1

Employing the method of the sixth embodiment described, the present embodiment utilizes hot water of 100° C. as the driving heat source of the evaporator, and applies saturated steam of 195° C. as the external heat source to heat the working medium in the thermal cycling loop, so as to compensate the thermal deficiency part of the heating capacity for the driving heat source of the generator caused by dissipation loss, utilizes dimethyl silicon oil as thermal cycling working medium, and utilizes cooling water of 20° C. to cool the absorbent crystallizer 141. In the present embodiment, the temperature outputted outward is 182° C., the pressure of the superheated vapor is 170 kPa, and coefficient of performance (COP) is 10.0. The COP of the present embodiment is calculated according to the following function:

$$COP = \text{heating capacity outputted/heat capacity of external heating source employed}$$

Embodiment 2

Employing the method of the sixth embodiment described, the present embodiment utilizes hot water of 100° C. as the driving heat source of the evaporator, and applies saturated steam of 195° C. as the external heat source to heat the working medium in the thermal cycling loop, so as to compensate the thermal deficiency part of the heating capacity for the driving heat source of the generator caused by dissipation loss, utilizes dimethyl silicon oil as thermal cycling working medium, and utilizes cooling water of 60° C. to cool the absorbent crystallizer 141. In the present embodiment, the temperature outputted outward is 182° C., the pressure of the superheated vapor is 170 kPa, and coefficient of performance (COP) is 10.0. The COP of the present embodiment is calculated according to the following function:

COP=heating capacity outputted/heat capacity of external heating resource employed Embodiment 3

Employing the method of the seventh embodiment described, the present embodiment utilizes hot water of 80° C. as the driving heat source of the evaporator, and applies saturated steam of 160° C. as the external heat source to heat the working medium in the thermal cycling loop, so as to compensate the thermal deficiency part of the heating capacity for the driving heat source of the generator caused by dissipation loss, applies dimethyl silicon oil as thermal cycling working medium, and utilizes cooling water of −18° C. to cool absorbent crystallizer 141. In the present embodiment, the temperature outputted outward is 148° C., the pressure of the superheated vapor is 95 kPa, and coefficient of performance (COP) is 5.5. The COP of the present embodiment is calculated according to the following function:

COP=heating capacity outputted/(heat capacity of external heating source employed+power consumption of compressor*3.0)

Wherein, the primary energy generating efficiency of the grid user end for powering the compressor is taken as 33.3%.

Embodiment 4

Employing the method of the fourth embodiment described, the present embodiment utilizes hot water of 7° C. as the driving heat source of the evaporator, and utilizes hot water of 50° C. as the external heat source to heat the working medium in the thermal cycling loop, so as to compensate the thermal deficiency part of the heating capacity for the driving heat source of the generator caused by dissipation loss, utilizes non-freezing solution as thermal cycling working medium, and utilizes cooling water of −18° C. to cool absorbent crystallizer 141. In the present embodiment, the temperature outputted outward is 37° C., the pressure of the superheated vapor is 0.8 kPa, and coefficient of performance (COP) is 5.0. It can be seen from the present embodiment that the heat energy at a high temperature is provided outward via the generator. Meanwhile the cool capacity at a low temperature is provided outward via the evaporator. The COP of the present embodiment is calculated according to the following function:

COP=heating capacity outputted/(heat capacity of external heating source employed+power consumption of compressor*3.0)

Wherein, the primary energy generating efficiency of the grid user end for powering the compressor is taken as 33.3%.

The following table 1 illustrates the operation parameters and performance of the embodiments described above.

TABLE 1

|  |  | Embodiment 1 | Embodiment 2 | Embodiment 3 | Embodiment 4 |
| --- | --- | --- | --- | --- | --- |
| Generator | Temperature of Thermal Cycling Working Medium In Inlet For Heat Exchanger (° C.) | 189.4 | 189.4 | 155.4 | 44.4 |
|  | Temperature of Thermal Cycling Working Medium In Outlet For Heat Exchanger (° C.) | 185.0 | 185.0 | 151.0 | 40.0 |
|  | Lithium Bromide Concentration In Inlet (wt %) | 60 | 66 | 56 | 56 |
|  | Lithium Bromide Concentration In Outlet (wt %) | 63 | 69 | 59 | 58 |
|  | Pressure of Outputted Superheated Vapor (kPa) | 170 | 100 | 95 | 0.8 |
|  | Pressure of Outputted Superheated Vapor (° C.) | 182 | 182 | 148 | 37 |
| Evaporator | Temperature Before Driving Heat Source Being Utilized (° C.) | 100 | 100 | 80 | 7 |
|  | Temperature After Driving Heat Source Being Utilized (° C.) | 95 | 95 | 75 | 2 |
|  | Pressure (kPa) | 81.5 | 81.5 | 36.1 | 0.6 |
| Absorber | Temperature of Thermal | 185.0 | 185.0 | 151.0 | 40.0 |

TABLE 1-continued

| | | Embodiment 1 | Embodiment 2 | Embodiment 3 | Embodiment 4 |
|---|---|---|---|---|---|
| | Cycling Working Medium In Inlet For Heat Exchanger (° C.) | | | | |
| | Temperature of Thermal Cycling Working Medium In Outlet For Heat Exchanger (° C.) | 189.0 | 189.0 | 155.0 | 44.0 |
| | Lithium Bromide Concentration In Inlet (wt %) | 75 | 75 | 75 | 66 |
| | Lithium Bromide Concentration In Outlet (wt %) | 72 | 72 | 72 | 64 |
| | Pressure (kPa) | 81.4 | 81.4 | 36.0 | 0.5 |
| Absorbent Crystallizer | Absorbent Crystallizer—Evaporator Temperature (° C.) | 20 | 60 | −18 | −18 |
| External Heat Resource Heating Device | Temperature of Thermal Cycling Working Medium In Inlet (° C.) | 189.0 | 189.0 | 155.0 | 44.0 |
| | Temperature of Thermal Cycling Working Medium In Outlet (° C.) | 189.4 | 189.4 | 155.4 | 44.4 |
| | COP | 10.0 | 10.0 | 5.5 | 5.0 |

While the foregoing disclosure discusses illustrative aspects and/or aspects, it should be noted that various changes and modifications could be made herein without departing from the scope of the described aspects and/or aspects as defined by the appended claims. Furthermore, although elements of the described aspects and/or aspects may be described or claimed in the singular, the plural is contemplated unless limitation to the singular is explicitly stated. Additionally, all or a portion of any aspect and/or aspect may be utilized with all or a portion of any other aspect and/or aspect, unless stated otherwise.

INDUSTRIAL APPLICATION

Because the absorption heat pump circulation systems and heating methods according to the present invention possesses an absorbent crystallizer, and the heat generated by the absorber is directly provided to the generator through thermal cycling, so as to basically save an external driving heat source required by the generator of the traditional absorptive heating circulation and realize absorption heating, to significantly increase Coefficient of Performance (COP) and significantly decrease the required temperature of the driving heat source, i.e. the temperature of the excess heat at a low temperature that can be utilized, so that it will be more applicable. Besides, since it is not necessary to provide condenser for the absorptive heat pump system according to the present invention, therefore different from the traditional absorptive heat pump circulation, in the present invention cooling water is not utilized to cool the condenser, so that the operation load of cooling tower is significantly relieved and water source is saved meanwhile.

What is claimed is:

1. An absorptive heat pump system, comprising:
a generator, equipped with a first heat exchanger, for condensing absorption solution and outputting steam;
an evaporator, equipped with a second heat exchanger;
an absorber, equipped with a third heat exchanger, containing an absorption solution;
an absorbent crystallizer, receiving and cooling the absorption solution from the absorber and/or the generator, and crystallizing to form absorbent crystals and an absorption solution after crystallization, wherein the absorption solution after crystallization is transferred to the generator and the absorbent crystals are transferred to the absorber; and the first heat exchanger and the third heat exchanger being connected to form a thermal cycling loop for transferring the absorption heat generated in the absorber to the generator.

2. The absorptive heat pump system according to claim 1 further comprising: an absorption solution self heat exchanger, for heat exchanging between the absorption solution from the generator and/or the absorber, and the absorption solution after the crystallization and/or the absorbent crystals or the absorption solution containing the absorbent crystals.

3. The absorptive heat pump system according to claim 1 further comprising: an absorption solution self heat exchanger, for heat exchanging between the absorption solution from the absorber, and the absorption solution after the crystallization from the absorbent crystallizer.

4. The absorptive heat pump system according to claim 1 further comprising: an absorption solution self heat exchanger, for heat exchanging between the absorption solution from the absorber, and the absorbent crystals from the absorbent crystallizer or the absorption solution containing the absorbent crystals from the absorbent crystallizer.

5. The absorptive heat pump system according to claim 1 further comprising: an absorption solution self heat exchanger, for heat exchanging between the absorption solution from the absorber as well as the absorption solution after the crystallization from the absorbent crystallizer, and the absorbent crystals or the absorption solution containing the absorbent crystals.

6. The absorptive heat pump system according to claim 5, wherein the absorption solution from the absorber and the absorption solution from the absorbent crystallizer are mixed to form a mixture and the mixture enters into the absorption solution self heat exchanger, and then exchanges heat with the absorption solution after the crystallization from the absorbent crystallizer and the absorbent crystals or the absorption solution containing the absorbent crystals.

7. The absorptive heat pump system according to claim 1, wherein the thermal cycling loop is provided with an external heat source heating device.

8. The absorptive heat pump system according to claim 7 further comprising a water source, for providing water to the evaporator.

9. The absorptive heat pump system according to claim 1 further comprising: a compression refrigeration subsystem comprising an absorbent crystallizer-evaporator, a compressor, an absorption solution heat exchanger-condenser, a throttle valve and a compression refrigeration working medium pipeline.

10. An absorption heating method, comprising:
(1) condensing an absorption solution in a generator wherein the generator—generates steam, outputs the steam, and outputs a concentrated absorption solution to an absorber;
(2) employing a heat source to heat an absorption solution in an evaporator to produce steam, and introducing the steam into the absorber;
(3) absorbing the steam from the evaporator by an absorption solution in the absorber, thereby generating absorption heat, wherein the concentration of the absorption solution in the absorber is decreased and the absorption solution in the absorber is outputted to an absorbent crystallizer;
(4) allowing the absorption solution in the absorbent crystallizer to be cooled and absorbent crystals to be crystallized and separated from the absorption solution;
(5) transferring the absorption solution after the crystallization to the generator, and transferring the absorbent crystals and the absorption solution containing the absorbent crystals to the absorber; and
(6) performing thermal cycling between the absorber and the generator, thereby transferring the absorption heat generated when the absorption solution absorbs the steam in the absorber to the generator.

11. The method according to claim 10, wherein before transferring the absorption solution after the crystallization to the generator and the absorption solution outputted from the absorber being cooled, the absorption solution after the crystallization exchanges heat with the absorption solution outputted from the absorber.

12. The method according to claim 10, wherein before the absorbent crystal being outputted to the absorber and the absorption solution outputted from the absorber being cooled, the absorbent crystals or the absorption solution containing absorbent crystals exchanges heat with the absorption solution outputted from the absorber.

13. The method according to claim 10, wherein before the absorption solution after the crystallization being outputted to the generator, the absorbent crystal being outputted to the absorber and the absorption solution outputted from the absorber being cooled, the absorption solution outputted from the absorber exchanges heat with the absorbent crystals and the absorption solution after the crystallization.

14. The method according to claim 10, wherein before the absorption solution after the crystallization being outputted to the generator, the absorbent crystals being outputted to the absorber and the absorption solution outputted from the absorber being cooled, the absorption solution outputted from the generator and the absorption solution outputted from the absorber are mixed to form a mixed absorption solution, the mixed absorption solution exchanges heat with the absorbent crystals and the absorption solution after the crystallization.

15. The method according to claim 10, wherein in the thermal cycling process of step (6), the heating capacity of the generator is compensated through an external heat source.

16. The method according to claim 15, wherein the temperature of the heat source in step (2) is no lower than 2° C.

17. The method according to claim 15, wherein the cooling capacity required by cooling and crystallizing the absorption solution in step (4) is provided by a compression refrigeration circulation.

18. The method according to claim 15, wherein the compression refrigeration circulation comprises:
compressing a refrigeration working medium, for increasing the pressure and temperature of the refrigeration working medium;
the refrigeration working medium with an increased temperature exchanging heat with the absorption solution after the crystallization from the absorbent crystallizer and/or the absorbent crystals or the absorption solution containing the absorbent crystals; and
the refrigeration working medium being dilated via a throttle valve and absorbing heat from the absorbent crystallizer.

19. The method according to claim 15, wherein the temperature of cooling and crystallizing the absorption solution in step (4) is −18~60° C.

* * * * *